(12) United States Patent
Kubota

(10) Patent No.: US 10,821,905 B2
(45) Date of Patent: Nov. 3, 2020

(54) APPARATUS FOR ATTACHING AN ACCESSORY TO A SEAT AND METHODS OF USE THEREOF

(71) Applicant: HONDA MOTOR CO., LTD., Tokyo (JP)

(72) Inventor: Yuji Kubota, Marysville, OH (US)

(73) Assignee: HONDA MOTOR CO., LTD, Tokyo (JP)

( * ) Notice: Subject to any disclaimer, the term of this patent is extended or adjusted under 35 U.S.C. 154(b) by 127 days.

(21) Appl. No.: 15/918,724

(22) Filed: Mar. 12, 2018

(65) Prior Publication Data

US 2019/0275949 A1  Sep. 12, 2019

(51) Int. Cl.
B60R 7/04 (2006.01)

(52) U.S. Cl.
CPC .................... B60R 7/043 (2013.01)

(58) Field of Classification Search
CPC combination set(s) only.
See application file for complete search history.

(56) References Cited

U.S. PATENT DOCUMENTS

| | | | |
|---|---|---|---|
| 6,139,101 A * | 10/2000 | Berringer | B60N 2/2821 297/256.1 |
| 6,279,798 B1 | 8/2001 | Partch et al. | |
| 6,347,832 B2 * | 2/2002 | Mori | B60N 2/2821 297/250.1 |
| 6,505,887 B2 * | 1/2003 | Hampton | B60N 2/06 297/250.1 |
| 6,681,969 B1 * | 1/2004 | Giedeman, III | B60R 7/043 224/275 |
| 6,796,610 B2 | 9/2004 | Nakagawa et al. | |
| 7,093,896 B2 * | 8/2006 | Morita | B60N 2/2821 297/253 |
| 7,364,213 B2 * | 4/2008 | Romolo | B60N 2/2824 296/68.1 |
| 7,427,103 B2 * | 9/2008 | Weber | B60N 2/2893 297/188.2 |
| 7,984,946 B2 * | 7/2011 | Zahar | B60N 2/2821 297/256.12 |
| 8,226,162 B2 * | 7/2012 | Campbell | B60N 2/2812 297/216.11 |

(Continued)

FOREIGN PATENT DOCUMENTS

| | | |
|---|---|---|
| DE | 102014100835 A1 | 7/2015 |
| EP | 1852313 A1 | 11/2007 |
| FR | 2981895 A1 | 5/2013 |

*Primary Examiner* — Monica E Millner
(74) *Attorney, Agent, or Firm* — Arent Fox LLP

(57) ABSTRACT

A method, apparatus, and system for mounting interchangeably mounting a module to a vehicle seat. The module may include a mounting portion. The docking apparatus may include a mounting receiving portion selectively engageable with the mounting portion of the module. The docking apparatus may further include one or more seat anchor fastening members that are selectively engageable with one or more child seat anchors of the vehicle seat. The docking apparatus may further include a support member operatively connected to an adjustment portion. The support member abut a portion of the vehicle seat, and the adjustment portion may be capable of altering the position of the docking apparatus with relation to the vehicle seat.

20 Claims, 13 Drawing Sheets

(56) References Cited

U.S. PATENT DOCUMENTS

| | | | | |
|---|---|---|---|---|
| 8,366,192 B2* | 2/2013 | Clement | ............... | B60N 2/2824 |
| | | | | 297/253 |
| 8,393,678 B2* | 3/2013 | Keegan | ................ | B60N 2/2803 |
| | | | | 297/256.16 |
| 8,454,089 B2* | 6/2013 | Nett | ..................... | B60N 2/2887 |
| | | | | 297/253 |
| 8,702,169 B2* | 4/2014 | Abadilla | ................ | B60N 2/062 |
| | | | | 297/256.12 |
| 9,102,249 B2* | 8/2015 | Mo | ........................ | B60N 2/28 |
| 9,150,163 B2 | 10/2015 | Cronkright, II et al. | | |
| 9,315,123 B2* | 4/2016 | Guo | ..................... | B60N 2/2827 |
| 9,440,562 B2* | 9/2016 | Heisey | ................ | B60N 2/2821 |
| 2002/0074840 A1* | 6/2002 | Nakagawa | ........... | B60N 2/2821 |
| | | | | 297/256.16 |
| 2009/0273215 A1* | 11/2009 | Barker | ................ | B60N 2/2821 |
| | | | | 297/253 |
| 2015/0230424 A1* | 8/2015 | Hartelius | ............. | A01K 1/0272 |
| | | | | 248/503 |

* cited by examiner

APPARATUS FOR ATTACHING AN ACCESSORY TO A SEAT AND METHODS OF USE THEREOF

FIELD OF THE INVENTION

Aspects of the present disclosure relate generally to an apparatus and methods for attaching an accessory to an automotive seat.

BACKGROUND

Most modern vehicles include anchors or brackets for securing child seats to a vehicle seat. The anchors may commonly be provided in cars, vans, minivans, or sports utility vehicles (SUVs). These anchors or brackets are generally connected to a vehicle seat frame and are of a standard size, shape, and configuration to safely work with a variety of child seats. One example of such a standard is Federal Motor Vehicle Safety Standard 225. Another example is International Organization for Standardization standard ISO 13216, which may commonly be referred to as ISOFIX. In most cases, the anchors or brackets protrude from the juncture of the seat bottom and the seatback or backrest of a vehicle seat. While the aforementioned brackets are standard on most newer vehicles, they currently provide very little utility when not utilized to mount a child seat.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

Aspects of the present disclosure relate to a docking device mountable to a vehicle seat. The device may include a module having a mounting portion. The device may further include a docking apparatus having a mounting portion that is selectively engageable with the mounting receiving portion of the module. The docking apparatus may further include first and second seat anchor fastening members that are selectively engageable with a first child seat anchor of the vehicle seat. The docking apparatus may further include a support member operatively connected to an adjustment portion. The support member may rest upon a bottom portion of the vehicle seat, and the adjustment portion may be capable of altering the orientation of the docking apparatus with relation to the vehicle seat.

In accordance with another aspect of the disclosure, a device mountable to a vehicle seat is disclosed. The device may include a module having a mounting portion and a docking apparatus. The docking apparatus may include a first surface with a mounting receiving portion that is selectively engageable with the mounting portion. The mounting receiving portion of the docking apparatus may further comprise an opening having a narrow region and a widened region, wherein the mounting portion is engageable with the narrow region of the opening. The mounting portion may comprise at least one protrusion having a waist portion and a top portion that is wider than the waist portion. The top portion may be dimensioned so as to be capable of passing through the widened region and so as to be prevented from passing through the narrow region of the opening. Further, the waist portion may be dimensioned so as to be capable of passing through the narrow region of the opening.

In accordance with another aspect of the disclosure, a docking apparatus mountable to a vehicle seat is disclosed. The docking apparatus may include a first surface with a mounting receiving portion capable of selectively engaging a mounting portion of a module. The docking apparatus may further include at least a first seat anchor fastening member selectively engageable with a first child seat anchor of the vehicle seat The docking apparatus may further include a first support member operatively connected to a first adjustment portion, wherein the first support member abuts a bottom portion of the vehicle seat. The first adjustment portion may move the first support member away from or toward the docking portion in a first direction. The docking apparatus may further include a second support member that is operatively connected to a second adjustment portion. The second support member may be contactable with seatback portion of the vehicle seat. The second adjustment portion may move the second support member away from or towards the docking apparatus along a second direction that is substantially perpendicular to the first direction.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further advantages thereof, will be best understood by reference to the following detailed description of illustrative aspects of the disclosure when read in conjunction with the accompanying drawings, wherein:

DETAILED DESCRIPTION

The disclosure relates to a docking apparatus that is mountable to an automotive seat. The docking apparatus may include a mounting receiving portion for interchangeably receiving an mountable module. The module may be any object or apparatus that is suitable for stably mounting to a vehicles seat, and may include for example: a storage compartment, a cup holder, a cooler, a heated and/or refrigerated storage compartment, storage organizer, storage caddy, an animal cage or bag, and/or a table. Each module or a series of modules may have a common mounting portion that interfaces with the mounting receiving portion of the docking apparatus and thus a series of different modules be interchangeably mountable to the docking apparatus. The docking apparatus may be removably mounted to a single or multiple child seat anchor brackets, for example. The child seat anchors may be located between a seatback and a seat bottom of a vehicle seat. In order to compensate for various different automotive seat structures and/or for various modules that may be mounted to the docking apparatus, the docking apparatus may further include a single or multiple support portions that support at least one portion of the docking apparatus and that are configured to contact the automotive seat surface. The support portions may be adjustable with relation to the docking apparatus.

In one example implementation, by mounting the docking apparatus to at least one seat anchor bracket, the docking apparatus may be stably and fixedly attached to the vehicle seat and/or body. Accordingly, each module may be mountable and removable from the mounting docket and may be mounted stably with relation to the vehicle seat and/or body using seat anchor brackets that may already be present in a vehicle. Each of the aforementioned details and further details will be described below with reference to the figures.

It is noted that definitions of selected terms are employed throughout the disclosure. The definitions include various examples and/or forms of components that fall within the scope of a term and that may be used for implementation. However, the examples are not intended to be limiting.

Example aspects of a system in accordance with aspects of the present disclosure are described throughout the specification. In the interest of clarity, not all features of an actual implementation are described in this specification. It will of course be appreciated that in the development of any such actual implementation, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Figure 1:
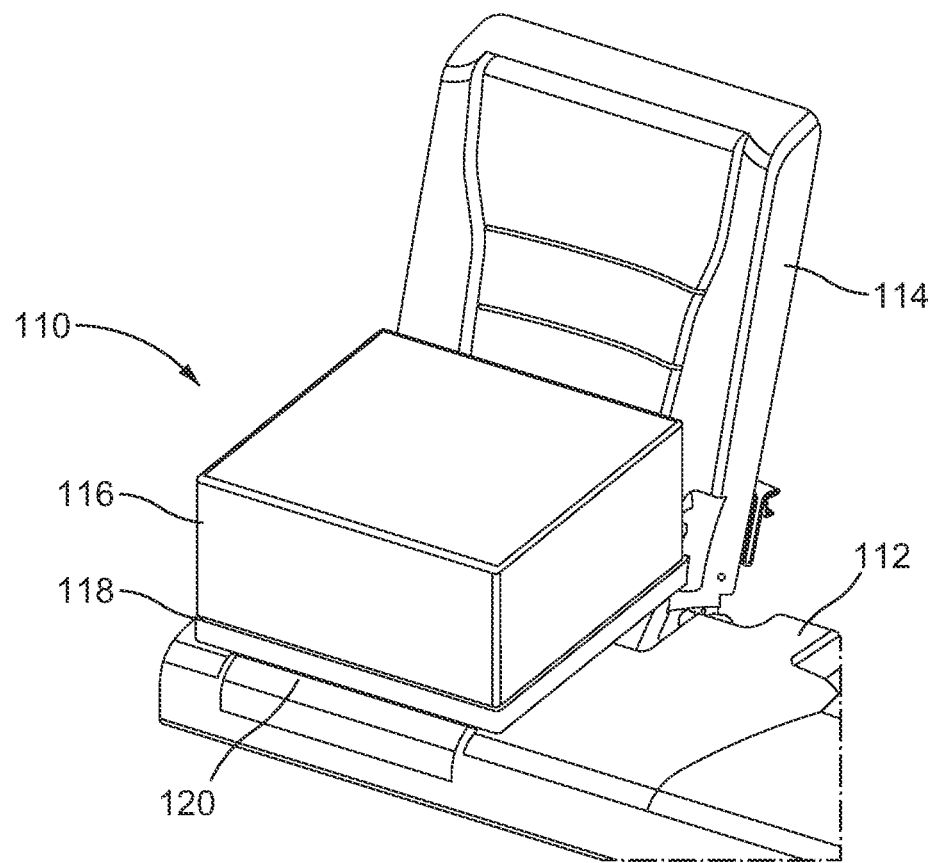
FIG. 1 is a perspective view of one example apparatus for attaching an accessory to a vehicle seat in accordance with an aspect of the disclosure.
Figure 2:
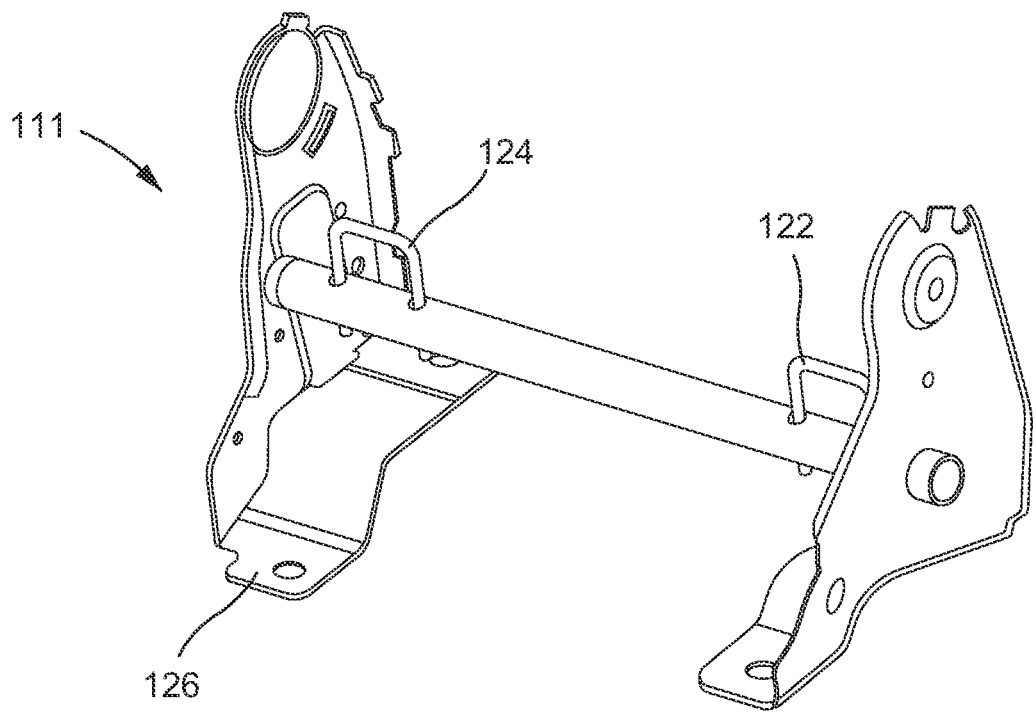
FIG. 2 is a perspective view of a seat anchor in accordance with an aspect of the disclosure.
Figure 3:
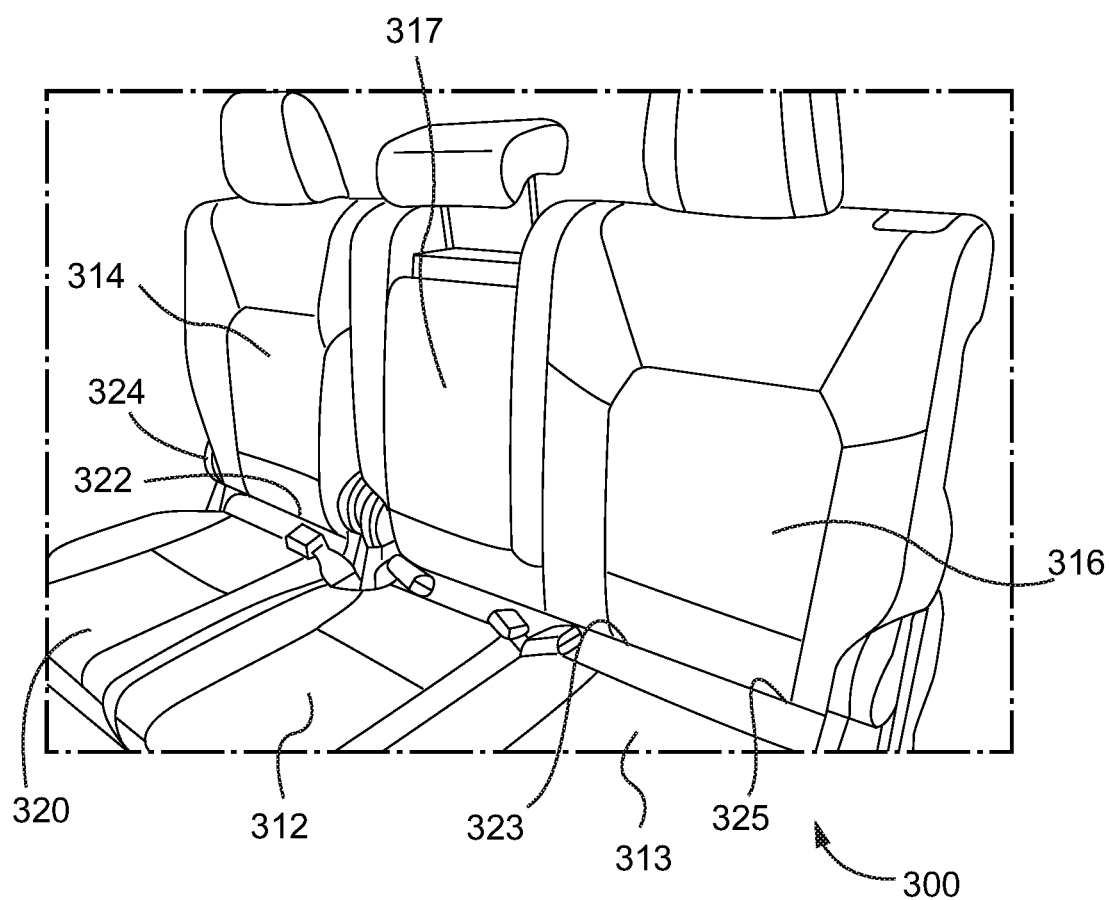
FIG. 3 is a perspective view of a seatback and seat bottom usable with an apparatus in accordance with an aspect of the disclosure.

FIG. 1 illustrates an example docking apparatus 118 that may be mountable to a vehicle seat 114. A portion of the docking apparatus 118 may rest on a bottom portion 120 of the seat 114. Further, the docking apparatus may be capable of receiving a module or accessory via a mounting receiving portion, as is discussed in further detail with reference to FIGS. 10-13. As discussed above, a module or accessory 116 (module or accessory may be used interchangeably throughout the present specification), may include any apparatus or object that may be desirably mounted to a seat. The module 116 may include a single one of, a plurality of, and/or any combination of: a storage compartment, a cup holder, a cooler, a heated and/or refrigerated storage compartment, storage organizer, storage caddy, an animal cage or bag, and/or a table, to name just a few examples. The docking apparatus 118 may further include at least one seat anchor fastening member, as is discussed in further detail with reference to FIGS. 5-6A. The seat anchor fasting member may be selectively engageable with a first and/or second child seat anchor of the vehicle seat, for example. FIG. 2 illustrates one example of a seat anchor 111 usable in accordance with aspects of the present disclosure. The seat anchor 111 may include a first seat anchor bracket 122 and a second seat anchor bracket 124. The seat anchor 111 may be a part of a seatframe and may be mounted to the floor of the vehicle via bracket 126, for example. The features dimensions of the first seat anchor bracket 122 and the second seat anchor bracket 124 may be in accordance with an industry standard seat anchor used in a variety of vehicles. One example of such a standard is Federal Motor Vehicle Safety Standard 225. Another example is International Organization for Standardization standard ISO 13216, which may commonly be referred to as ISOFIX. Under the aforementioned standard, ISOFIX anchors are required to secure a weight of 33 kg and include two loop shaped brackets that have a center to center distance between anchors of 280 mm. As shown in FIG. 3, one or more seat anchor brackets 322-325 may protrude from or may be accessible via the juncture of the seat bottom 313 and/or 320 and the seatback or backrest 314 and/or 316 of a vehicle seat 300.

Figure 4A:
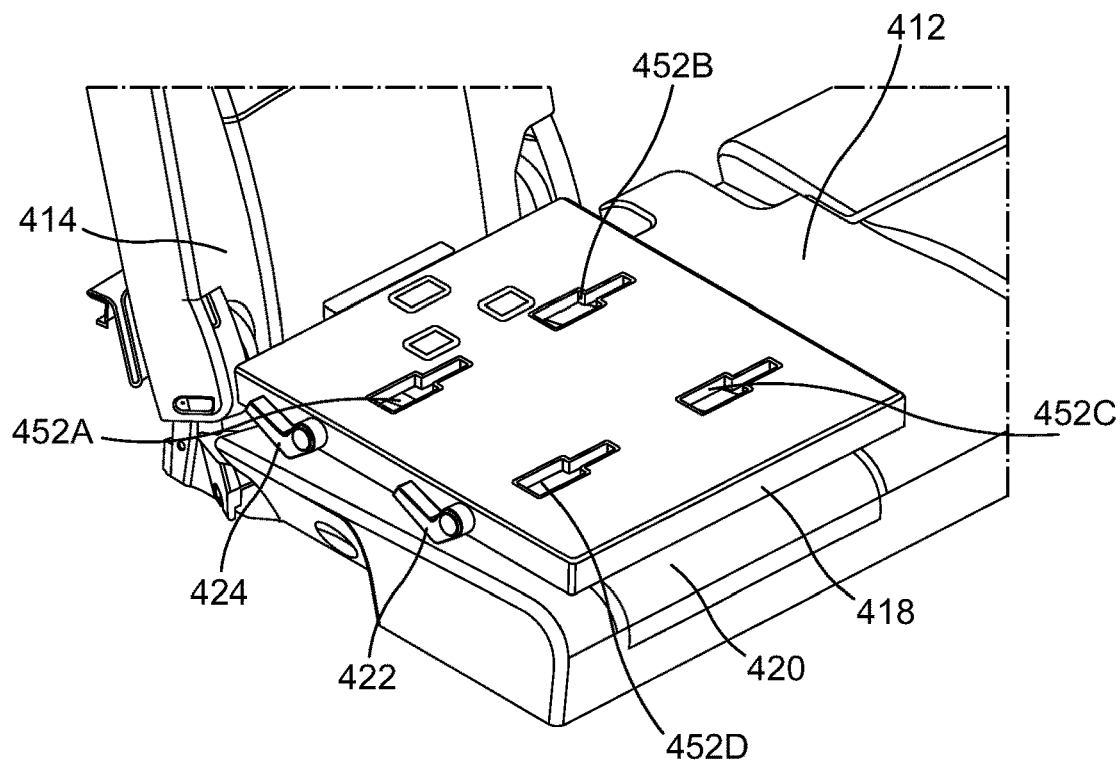
FIG. 4A is a perspective view of one example of an apparatus for attaching an accessory to a vehicle seat in accordance with an aspect of the disclosure.
Figure 4B:
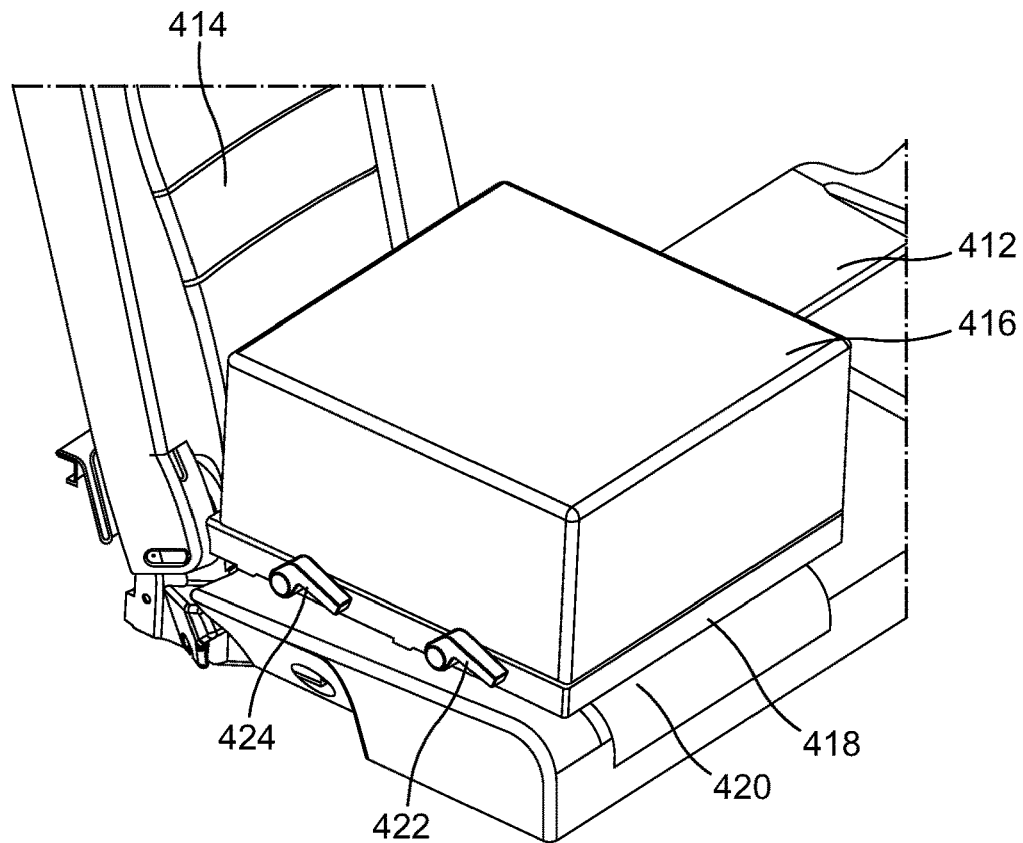
FIG. 4B is a perspective view of one example of an accessory or module mounted to the apparatus for attaching an accessory of FIG. 4A, in accordance with an aspect of the disclosure.

FIGS. 4A-5B illustrate one example of a seat docking apparatus 418 and an example module 416 interoperable therewith. As shown in FIG. 4A, the seat docking apparatus 418 may be configured to rest on a seat surface 412. As shown, for example, in FIG. 4B, the module 416 may be removably mounted to the seat docking apparatus 418 via a mounting receiving portion, which may include, for example, openings 452A-D (FIG. 4A) configured to receive a mounting portion (not shown in the view of FIG. 4A or 4B) of the module 416. One example implementation of the mounting receiving portion and mounting portion is discussed in further detail with reference to FIGS. 10A-B. The docking apparatus 418 shown in FIG. 4A may further include a pivotable first locking latch 422 and second locking latch 424, both of which may be pivoted from a module release position as shown in FIG. 4A, to a module locking position as shown in FIG. 4B.

Figure 5A:
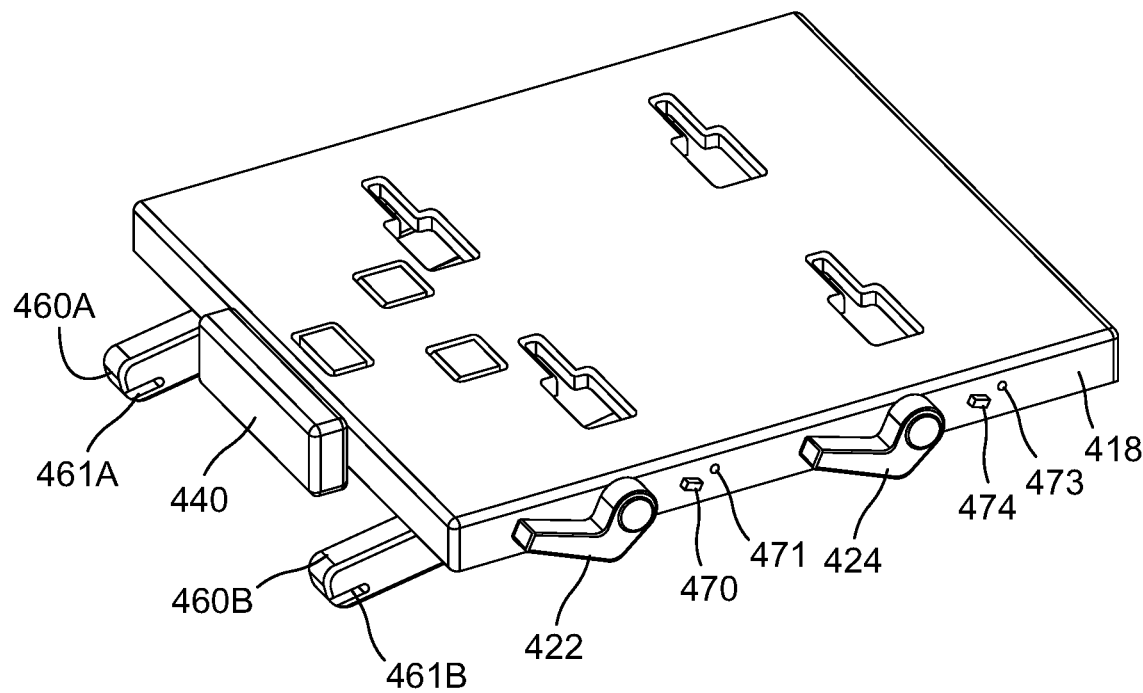
FIG. 5A is a perspective view of one example apparatus for attaching an accessory to a vehicle seat in accordance with an aspect of the disclosure.
Figure 5B:
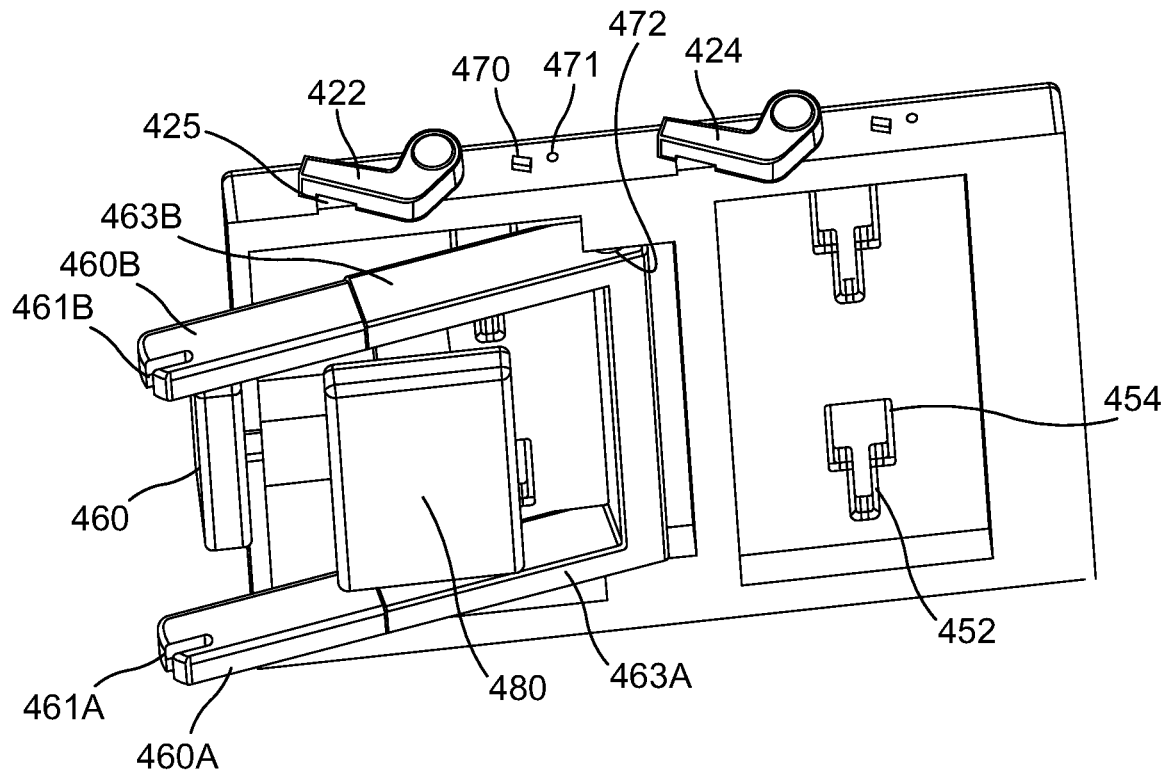
FIG. 5B is another perspective view of one example apparatus for attaching an accessory to a vehicle seat in accordance with an aspect of the disclosure.

The docking apparatus 418 may further include a first rotation limiting portion 425 (FIG. 5B) for limiting the rotation of the first locking latch 422 when the locking latch is rotated in the module release position direction. The docking apparatus 418 may further include a second rotation limiting portion 470 (FIGS. 5A and 5B) for limiting the rotation of the first locking latch 422 when the first locking latch 422 is rotated to a locking position. The docking apparatus 418 may also include a locking latch engagement portion 471 (FIGS. 5A and 5B) that may be formed as a convex protrusion, for example, that corresponds to a concave portion on the locking latch (not shown in the view of FIGS. 5A and 5B). Accordingly, when the first locking latch 422 is rotated to a module locking position, the locking latch engagement portion 471 may engage with the concave portion of the first locking latch 422 and thereby prevent or inhibit the locking latch 422 from being inadvertently being moved to the module unlocking position. Further, the engagement of the concave portion of the first locking latch 422 with the convex protrusion of the latch engagement portion 471 may provide a tactile sensation to a user operating the lever when the engagement position is reached. As shown in FIGS. 5A-B, similar to the aforementioned first rotation limiting portion 425, second rotation limiting portion 470, and latch engagement portion 471, an additional rotation limiting portion 474, and additional latch engagement portion 473 may also be provided on the docking apparatus 418 for second locking latch 424.

Figure 6A:
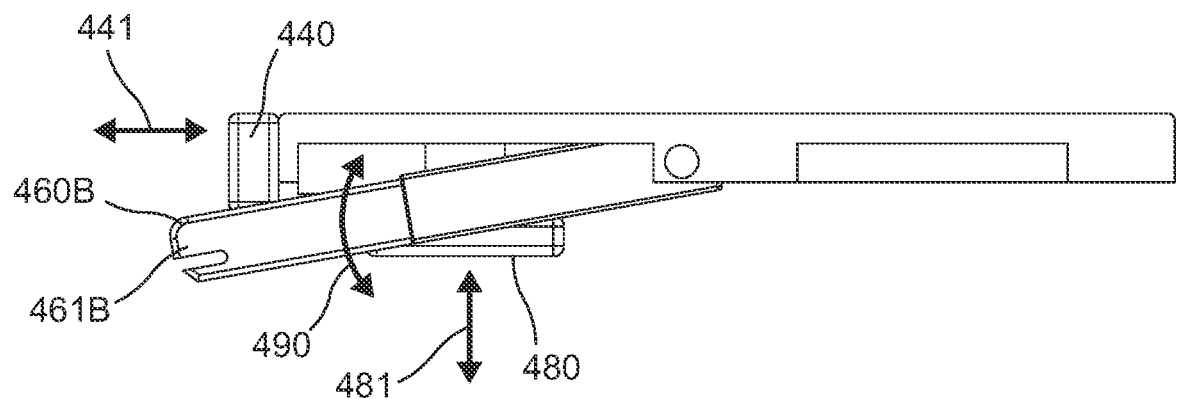
FIG. 6A is a side view of one example apparatus for attaching an accessory to a vehicle seat in accordance with an aspect of the disclosure.

As shown in FIGS. 5A and 5B, the docking apparatus 418 may include a first seat anchor fastening member 460A and a second seat anchor fastening member 460B that are selectively engageable with a first and second child seat anchor of a vehicle seat (see, e.g., anchor brackets 122 and 124 in FIG. 2). The first seat anchor fastening member 460A and the second seat anchor fastening members 460B may be pivotally mounted to the bottom of the docking apparatus 418 via pivot 472 (FIG. 5B). Accordingly, each of the first seat anchor fastening member 460A and the second seat anchor fastening members 460B may be pivotable in either direction (see arrow 490; FIG. 6A). Each of the first and second seat anchor fastening members 460A and 460B may also be telescopically extendable and coaxially mounted with coaxial segments 463A and 463B respectively (FIG. 5B). Accordingly, each of the first and second seat anchor fastening members 460A, 460B may slidably engage with coaxial segments 463A and 463B so as to allow the seat anchor fastening members 460A and 460B to extend relative to pivot 472.

Figure 6B:
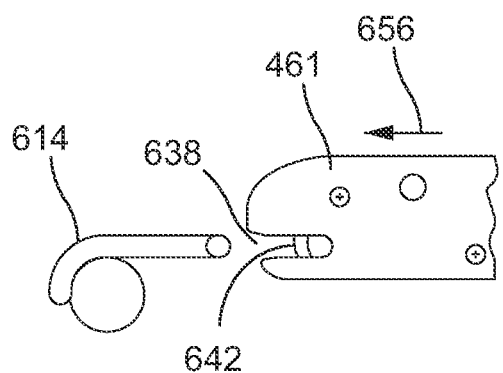
FIG. 6B-D show side views of one example of a seat anchor engagement portion in accordance with one aspect of the disclosure.
Figure 6C:
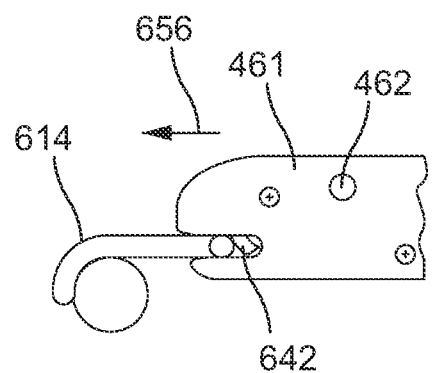
Figure 6D:
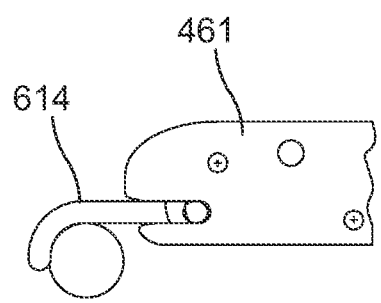

Each of the seat anchor fastening members 460A and 460B may include a seat anchor engagement portion 461A and 461B respectively (FIGS. 5A, 5B). The seat anchor engagement portions 461A and 461B may include any suitable method for removable attachment of each of the anchor fastening members 460A and 460B to the aforementioned seat anchor(s) (see, e.g., anchor brackets 122, 124 of FIG. 2). For example, the seat anchor engagement portions 461A and 461B may each include a hook portion that engages with each anchor, a wire that loops around each anchor or any other suitable features and/or methods of connection. One example of an anchor engagement portion usable in accordance with aspects of the present disclosure is shown in FIGS. 6B-D. An anchor engagement portion 461 may include a latch mechanism having a slot 638 and a latch 642. When the anchor engagement portion 461 is engaged with a seat anchor bracket (e.g., bracket 614 in FIGS. 6B-6D) in direction 656, the seat anchor bracket 614 may cause the latch 642 to retract as shown in FIG. 6C. Once the seat anchor bracket 614 reaches the end of slot 638, the latch 642 may return to its original position, thereby securing the seat anchor bracket 614 to the anchor engagement portion 461 as shown in FIG. 6D. When it is desired to release the seat anchor bracket 614 from the latch 642, release portion 462 may be engaged (e.g., pressed by a user) so as to cause latch 642 to retract thereby selectively allowing release of the seat anchor bracket 614.

As shown in FIGS. 5B and 6A, the docking apparatus 418 may further include a first support member 480, configured to rest, for example, against a portion of an automotive seat. The first support member 480 may be movable away from and towards the body of the docking apparatus 418 along a first direction 481 (FIG. 6A), for example, via a first adjustment portion. One example of the first adjustment portion is discussed in further detail with reference to FIGS. 7A-B and 8 below. Through movement of the first support member 480, the docking apparatus 418 may be leveled or adjusted with relation to a seat bottom surface, for example. The docking apparatus may further include a second support member 440, which may be interchangeably referred to as a support member, that is configured to rest on a seatback or backrest of an automotive seat, for example. The second support member 440 may be movable away from and towards the body of the docking apparatus 418 along a second direction 441 (FIG. 6A), which may be interchangeably referred to as a substantially horizontal direction, for example, via a second adjustment portion, which may be interchangeably referred to as an adjustment portion. The second direction 441 may be substantially perpendicular to the first direction 481. One example of the second adjustment portion is discussed in further detail with reference to FIGS. 9A-9D below. Through movement of the second support member 440, the docking apparatus 418 may be tensioned against or adjusted, for example, with relation to a seatback or backrest of the automotive seat.

Figure 7A:
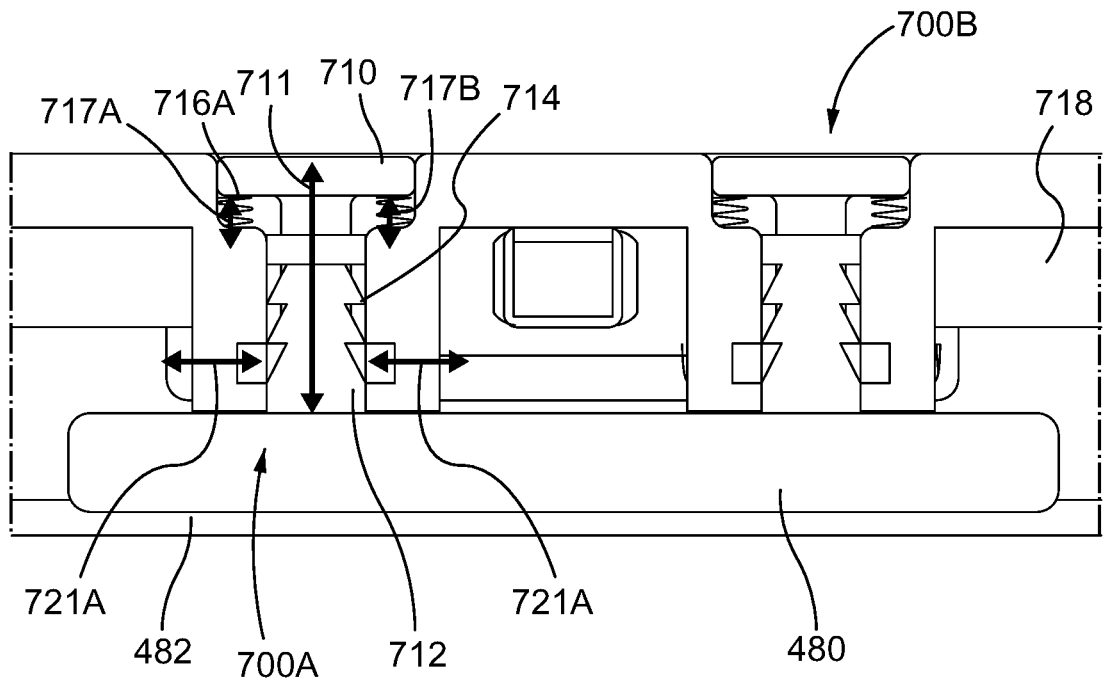
FIG. 7A is a side see-through view of one example adjustment mechanism usable with an apparatus for attaching an accessory to a vehicle seat, in accordance with an aspect of the disclosure.
Figure 7B:
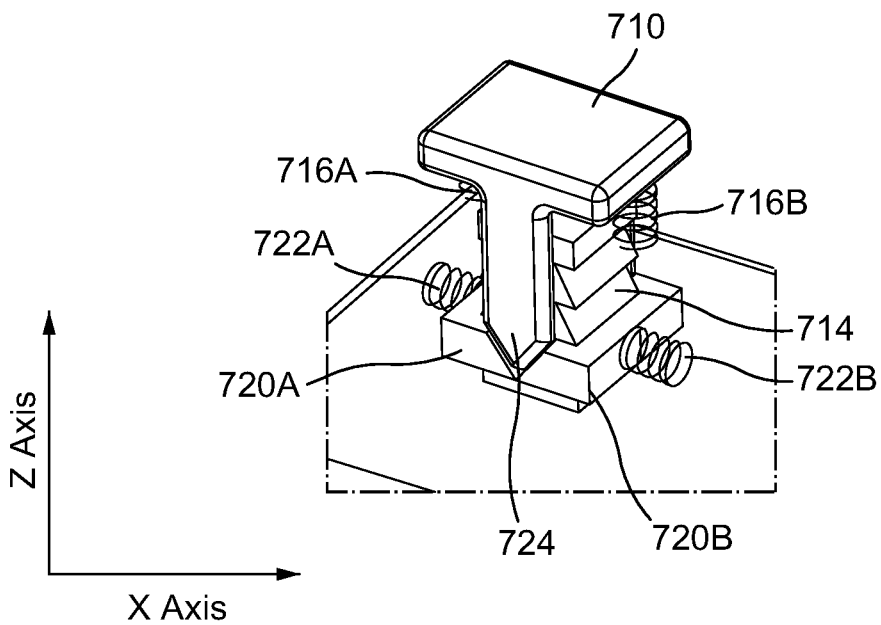
FIG. 7B is a magnified perspective view of a portion of the adjustment mechanism of FIG. 7A.
Figure 8:
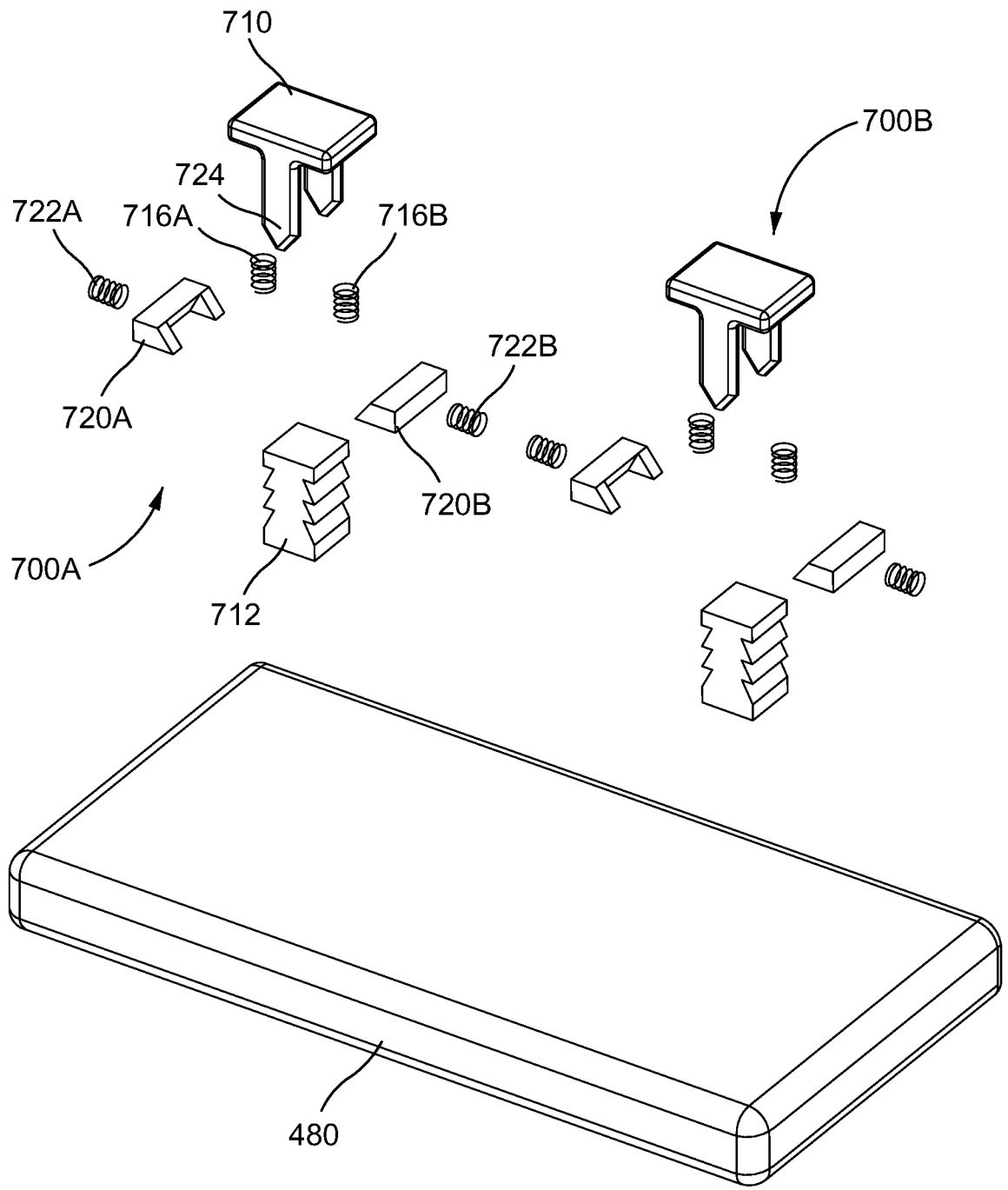
FIG. 8 is an exploded perspective view of the adjustment mechanism of FIGS. 7A-B.

FIGS. 7A-B and 8 illustrate one example of the aforementioned first support member 480. As shown, first adjustment portion(s) 700A, 700B may be operatively connected to the first support member 480. It is noted that in FIGS. 7A-B and 8 the adjustment portions 700A, 700B comprise two mechanisms, and the structures of each of the mechanisms may be similar or substantially identical. Accordingly, only one adjustment mechanism is referenced in the detailed description. Further, it is noted that, as an alternative, a single instead of two adjustment portions 700A and 700B may be employed. Further, more than two mechanisms may also be used if greater adjustability is desired.

The first support member 480 may be configured to be placed in contact with a seat (e.g., seat bottom 482 when the aforementioned anchor fastening members 460A and 460B (FIG. 6A) are connected to the seat anchor brackets 122 and 124 (FIG. 2). The adjustment portions 700A, 700B may each include a first advancement member 712 that is operatively connected to the first support member 480. The first advancement member 712 may include a toothed portion 714, for example. The adjustment portions 700A, 700B may each further include first and second engagement members 720A and 720B (FIG. 7B) each having wedge shaped portions, for example. The wedge shaped portions of each of the first and second engagement members 720A and 720B (FIG. 7B) may be biased towards the toothed portion 714 of the first advancement member 712 in the directions shown by arrows 721A and 721B in FIG. 7A, respectively via biasing members 722A and 722B (FIG. 7B). Accordingly, the wedge shaped portions of each of the first and second engagement members 720A and 720B may therefore be biased towards engagement with corresponding teeth of the toothed portion 714. The adjustment portions 700A, 700B may each further include a first button 710 that has a wedge shaped portion 724. As shown in FIG. 7A, the first button 710 may be biased in an upward Z direction (see arrows 717A and 717B) by biasing devices 716A and 716B respectively. It is noted that while coil springs are shown in all of the examples of the biasing members in the figures, any suitable type of biasing member may be used.

In operation, as shown in FIG. 7A, the position of the first support member 480 may be adjusted with relation to a docking apparatus 718 along first direction 481 (FIG. 6A), by pressing the first button 710. As best shown in FIGS. 7A-B, pressing the first button 710 in a downward Z direction as shown in the figures may cause the wedge shaped portion 724 of the first button to slidably engage with the wedge shaped portions of each of engagement members 720A and 720B, thereby causing separation of first and second engagement members 720A and 720B. The separation of the engagement members 720A and 720B may thereby allow the downward force on first button 710 to move the first advancement member 712 in a downward Z direction. Releasing the first button 710 causes the wedge shaped portion 724 to retract, thereby causing the wedge shaped portion of the engagement members 720A and 720B to engage with a second tooth of the toothed portion 714 on the first advancement member 712. Accordingly, in operation, the first button 710 may be pressed to move the first support member 480 away from the docking apparatus 718 in direction 711. Further, in operation the pressing of the first button 710 while applying a compressive force to the first support member 480 towards the docking apparatus 718 may cause the first support member to move closer to the docking apparatus along direction 711. It is further noted that when the first support member 480 is in contact with a seat (e.g, seat bottom 482, pressing of the first button 710 while applying a compressive force to the docking apparatus and the first support member 480 may also cause the first support member 480 to move closer to the docking apparatus 718 along direction 711.

Figure 9A:
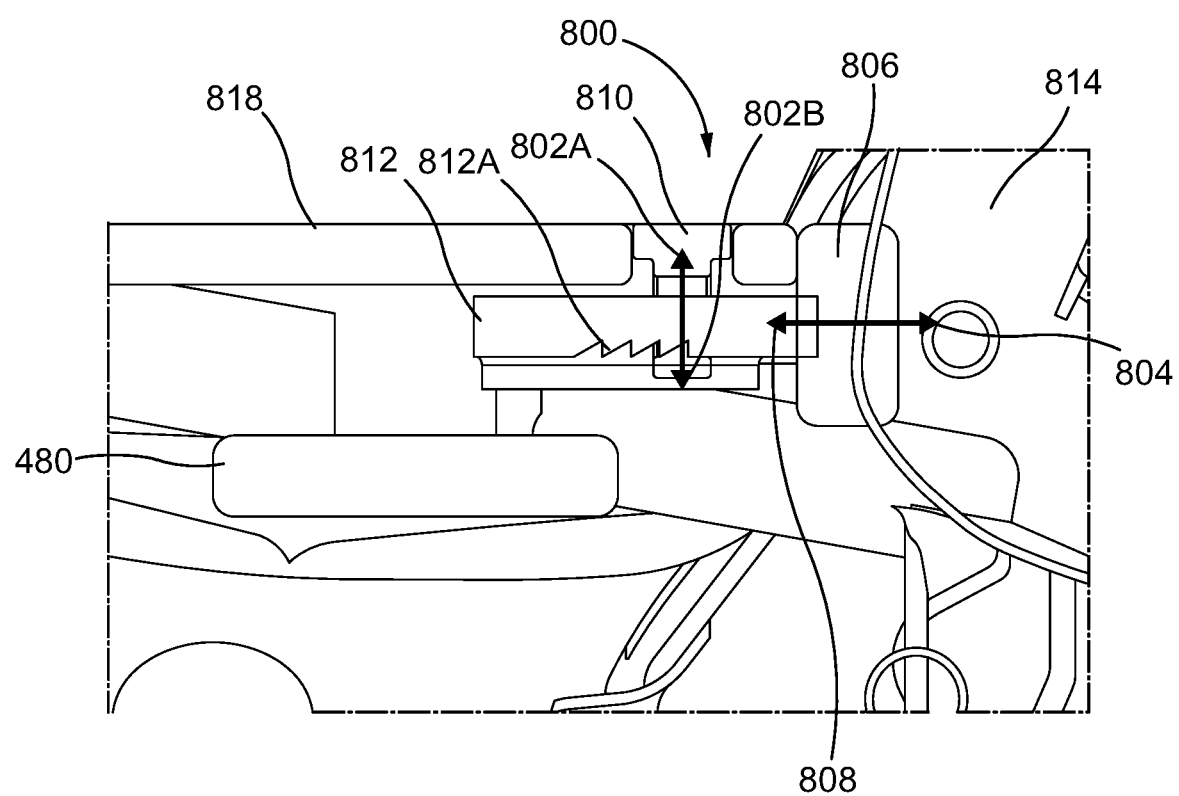
FIG. 9A is a side see-through view of one example adjustment mechanism usable with the apparatus for attaching an accessory to a vehicle seat, in accordance with an aspect of the disclosure.
Figure 9B:
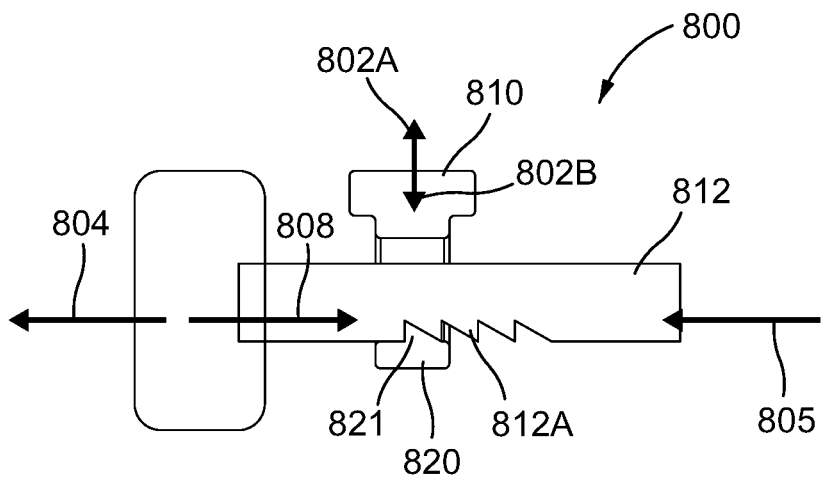
FIG. 9B is a side see-through view of the adjustment mechanism of FIG. 9A.
Figure 9C:
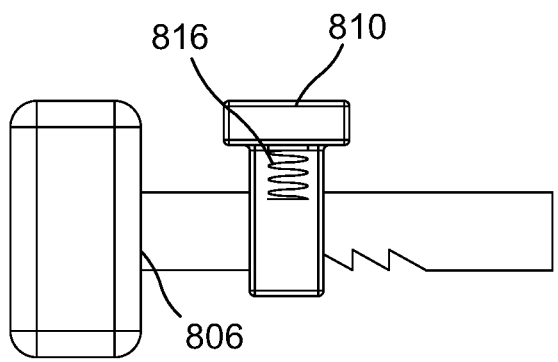
FIG. 9C is a side see-through view of the adjustment mechanism of FIG. 9A-B.
Figure 9D:
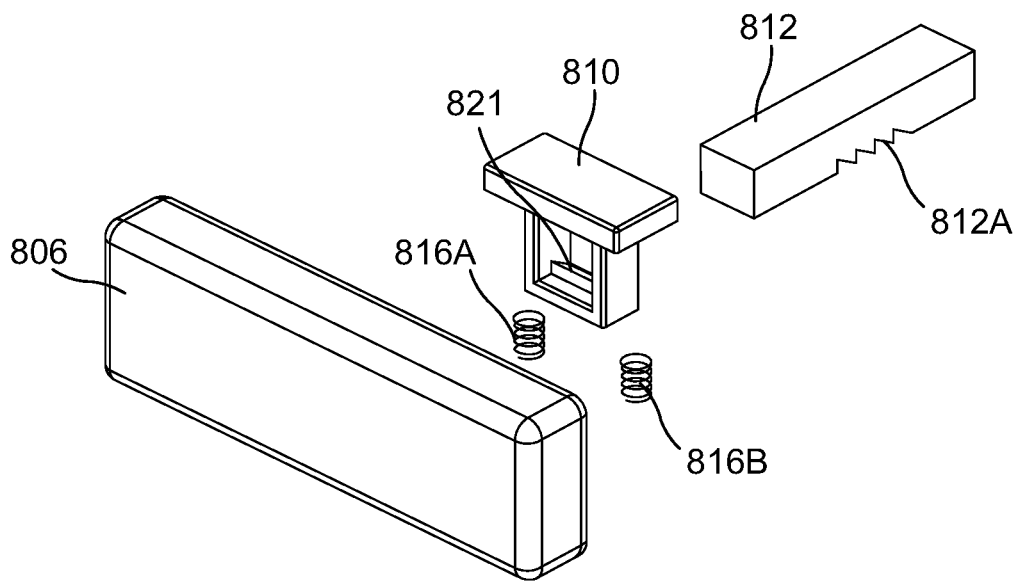
FIG. 9D is an exploded perspective view of the adjustment mechanism of FIGS. 9A-C, in accordance with an aspect of the disclosure.

As shown in FIG. 9A-9D, the second support member 806 may be configured to be adjustably placed in contact with a seatback or backrest 814, for example, of an automotive seat when the aforementioned anchor fastening members 460A and 460B (FIG. 6A) are connected to the seat anchor brackets 122 and 124 (FIG. 2). The second support member 806 may be operatively connected to a second adjustment portion 800, which may be interchangeably referred to as an adjustment portion. The second adjustment portion 800 may include a second advancement member 812, which may be interchangeably referred to as an advancement member, that is operatively connected to the second support member 806. The second advancement member 812 may include a toothed portion 812A. As shown in FIG. 9B, the second adjustment portion 800 may further include a button which may be interchangeably referred to as a second button 810 having an engagement member, which may be interchangeably referred to as a second engagement member 820 with a wedge shaped portion 821. The wedge shaped portion 821 may be biased towards the toothed portion 812A of the second advancement member 812 in a first (upward) direction 802A via a biasing member 816 (FIG. 9C). Accordingly, the wedge shaped portion 821 of the second engagement member 820 may thereby be biased towards engagement with at least one of the plurality of teeth of the toothed portion 812A. It is noted that the biasing member 816 (FIG. 9C) may comprise a plurality of biasing members 816A and 816B, as shown in FIG. 9D. Further, it is noted that while coil springs are shown in all of the examples of the biasing members shown in the figures, any suitable type of biasing member may be used.

In operation, the position of the second support member 806 (FIG. 9A) may be adjusted with relation to a docking apparatus 818 along first direction 802A, such as to advance the second support member 806 towards a seatback or backrest 814 of a seat in direction 804 or to retract towards the docking apparatus in direction 805, by pressing the second button 810. As best shown in FIGS. 9B-C, pressing the second button 810 in a second (downward) direction 802B may cause the wedge shaped portion 821 of the second engagement member 820 to separate from the toothed portion 812A of second advancement member 812. The separation of the wedge shaped portion 821 from the toothed portion 812A allows for the movement of the second advancement member 812 and the second support member 806 along a first direction to advance towards a seatback or backrest of a seat in direction 804 or to retract towards the docking apparatus in direction 808. Releasing the second button 810 causes the wedge shaped portion 821 to engage with a single one of the toothed portion 812A on the second advancement member 812 thereby locking the position of the second support member 806 with relation to the docking apparatus 818. Accordingly, in operation the pressing of the second button 810 while applying a compressive force to the second support member 806 towards the docking apparatus 818 causes the second support member 806 to move closer to the docking apparatus 818 in direction 808. Likewise, pressing of the second button 810 while pulling the second support member 806 away from the docking apparatus 818 causes the second support member 806 to move away from the docking apparatus 818 in direction 804. Further, the second advancement member 812 may be biased in direction 805 via a biasing member (not shown). The addition of a biasing member may cause the second advancement member 812 to move in direction 804 once the second button 810 is pressed to either assist a user in pulling the second support member 806 away from the docking apparatus 818 or to cause the second support member 806 to automatically move in direction 804 once the second button 810 is pressed.

Figure 10A:
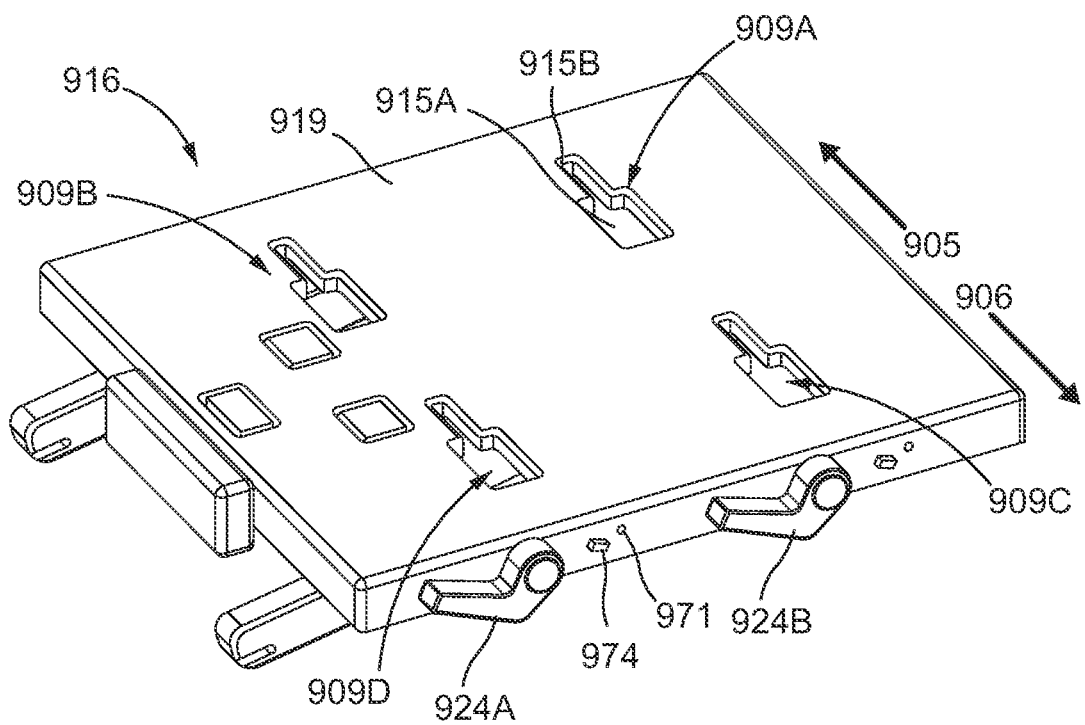
FIG. 10A is a perspective view of one example apparatus for attaching an accessory to a vehicle seat in accordance with an aspect of the disclosure.
Figure 10B:
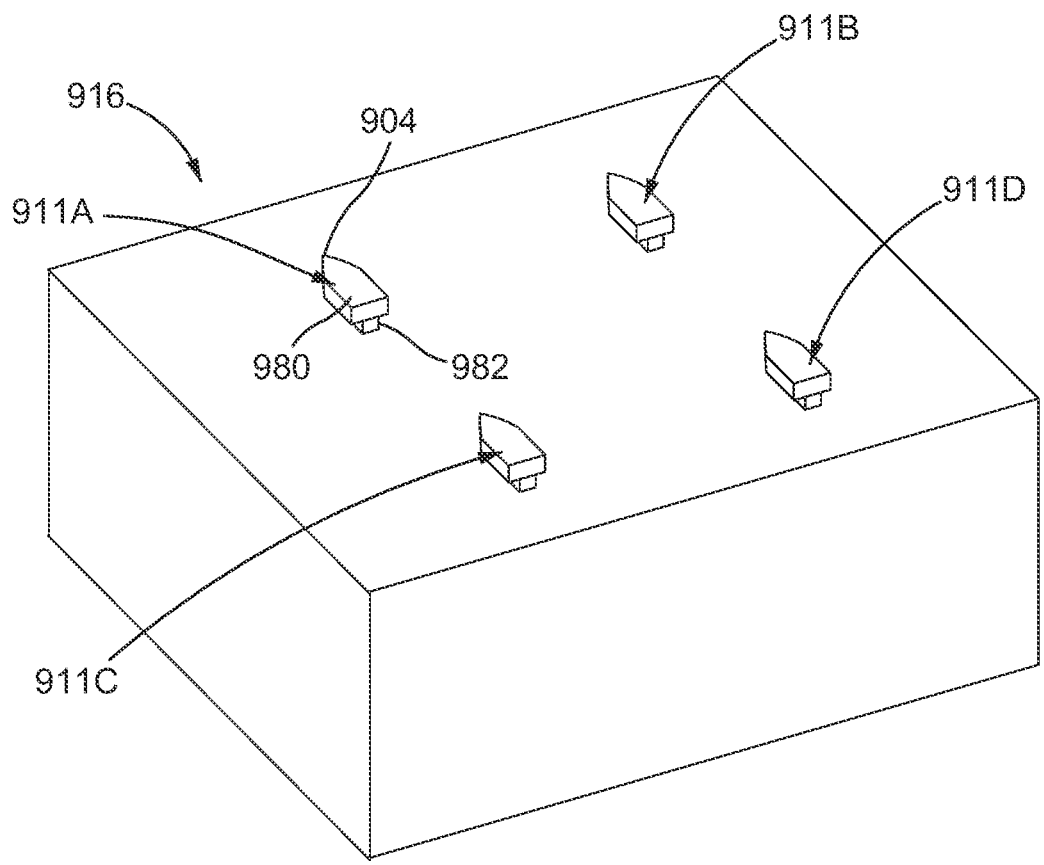
FIG. 10B is a perspective view of one example an accessory or module in accordance with an aspect of the disclosure.

FIG. 10A-10B illustrate one example of a seat docking apparatus 918 and an example module 916. The module 916 of FIG. 10B may be removably mounted to the seat docking apparatus via a mounting receiving portion, which may include openings or notches 909A-D (FIG. 10A) configured to receive corresponding mounting portions 911A-D of the module 916. The docking apparatus 918 of FIG. 10A may have a first flat surface 919. Each of the openings or notches 909A-D may extend along a mounting direction 905. One example of an opening 909A may have a widened region 915A. The opening 909A may further comprise a narrow region 915B. It is noted that each of the openings 909A-D may have a similar or identical structure to opening 909A.

As shown in FIG. 10B, an example module 916 may have mounting portions 911A-D. One example of a mounting portion 911A is shaped as a protrusion having top portion 980 and a narrower waist portion 982. The mounting portion 911A may further comprise a wedge shaped or tapered tip portion 904. In operation, a user may engage the module 916 with the docking apparatus 918 (FIG. 10A) such that the mounting portions 911A-D of module 916 align with the widened regions of each of openings 909A-D of the docking apparatus 918 (FIG. 10A). The widened regions 915A of each of the openings 909A-D for docking apparatus 918 of FIG. 10A are dimensioned to be capable of receiving the top portion 980 (FIG. 10B) of each of the mounting portions 911A-D (FIG. 10B) of the module 916 (FIG. 10B). Accordingly, when the module 916 (FIG. 10B) and the docking apparatus 918 (FIG. 10A) are aligned as discussed above, the top portion 980 of each of the mounting portions 911A-D may be passed through the widened region 915A of each of the openings 909A-D. Once the top portion 980 of each of the mounting portions 911A-D passes through the widened region 915A of each of the openings 909A-D, the module may be moved in a mounting direction 905 (FIG. 10A) so as to allow the waist portion 982 of each mounting portion 911A-D to slidably engage with the narrow region 915B at each of the openings 909A-D. The top portion 980 of each mounting portion 911A-D may be dimensioned so as to prevent from passing of each portion 980 through the corresponding narrow region 915B of each of the openings 909A-D. Accordingly, once the module 916 is moved in mounting direction 905 (FIG. 10A), the module 916 cannot be easily disengaged with the docking apparatus 918 unless the module 916 is moved in the module unmounting direction 906 (FIG. 10A) so as to move each of the mounting portions 911A-D to the corresponding widened region 915A so as to enable passage of the top portion 980 therethrough.

Once each of the mounting portions 911A-D of the module 916 are engaged with the openings 909A-D of the docking apparatus 918, the module 916 may be prevented from moving in the module unmounting direction 906 (FIG. 10A) via engagement of one or more locking features (e.g., locking latches 924A and 924B shown in FIG. 10A).

One example of operation of an example locking feature is shown in FIGS. 11A-13. Locking latches 924A and 924B may be pivotably connected to the docking apparatus 918. Each of the locking latches 924A and 924B may be pivotable in direction(s) 981 (FIG. 12A). As best shown in FIG. 12A, each of the locking latches 924A and 924B may be pivotable from a module release position 980A to a module locking position 980B. In a module release position 980A, the locking latch 924A, 924B does not extend so as to overlap with side surface of the module 916. In a module locking position 980B, a portion 993 of the locking latch 924A, 924B overlaps the side surface of module 916 in region 992 (FIG. 12B). Accordingly, when the locking latch 924A, 924B is in the module locking position 980B, the module 916 is prevented from being slid in a module unmounting direction 906 (FIG. 10A), thereby serving to assist in locking engagement of the module 916 with the docking apparatus 918.

The docking apparatus 918 may further include a first pivot limiting portion 925 (FIGS. 11C and 12A) for limiting the pivot of the locking latch 924 when the locking latch 924A, 924B is rotated towards the module release position 980A. The docking apparatus 918 may further include a second pivot limiting portion 974 for limiting the pivot of the locking latch 924A, 924B when the locking latch 924A, 924B is rotated towards the module locking position 980B.

Figure 11A:
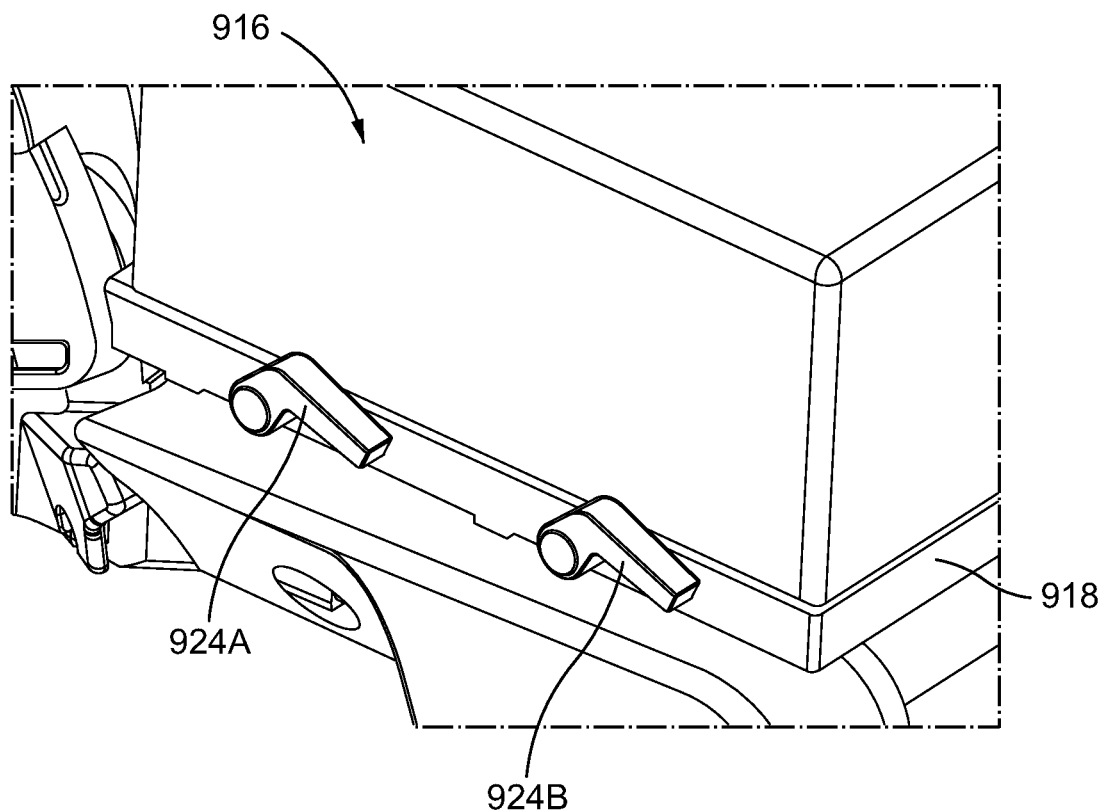
FIG. 11A is a perspective view of one example of a latching mechanism useable with an apparatus for attaching an accessory, in accordance with an aspect of the disclosure.
Figure 11B:
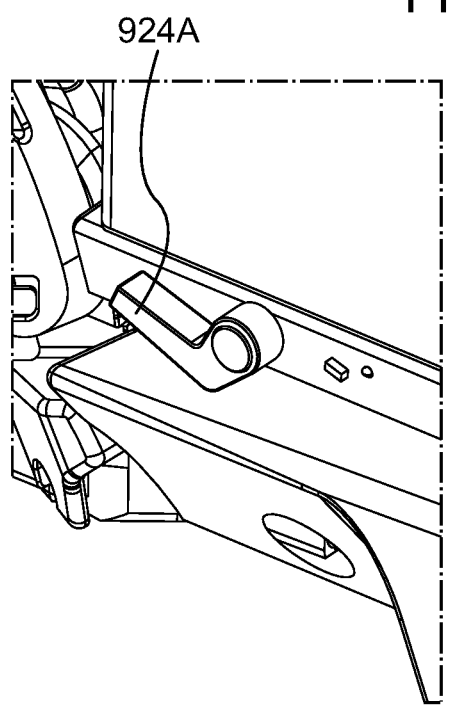
FIG. 11B is a perspective view of one example of a latching mechanism useable with an apparatus for attaching an accessory, in accordance with an aspect of the disclosure.
Figure 11C:
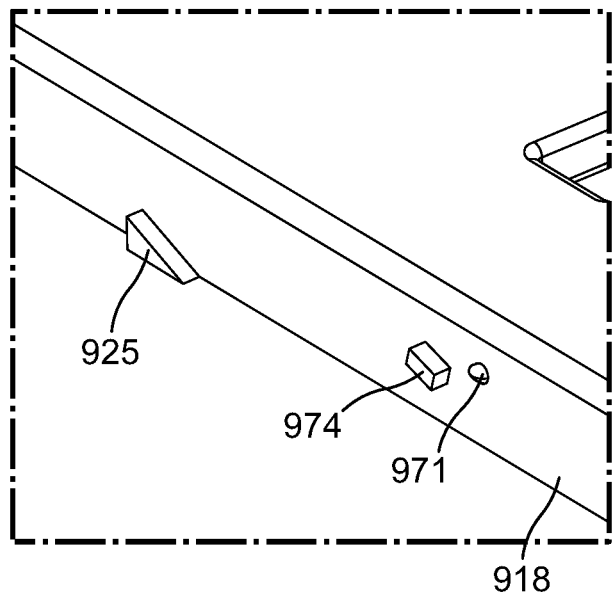
FIG. 11C is a magnified perspective view of a portion of the latching mechanism shown in FIGS. 11A-B.
Figure 12A:
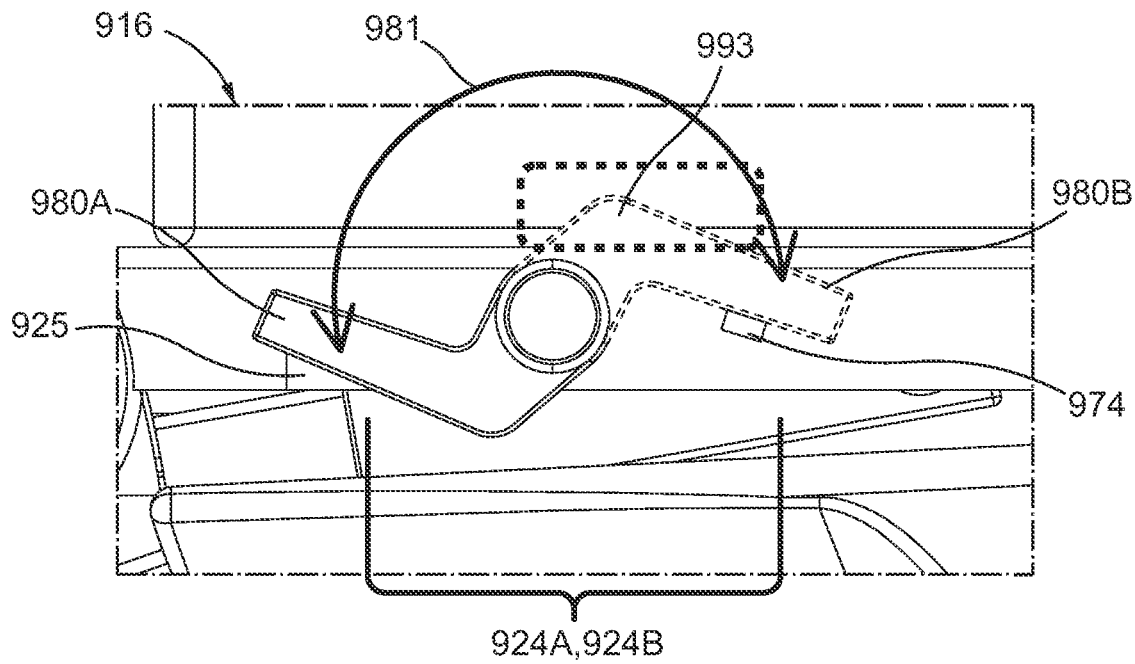
FIG. 12A is a side view of an example latching mechanism usable with the apparatus for attaching an accessory in accordance with an aspect of the disclosure.
Figure 12B:
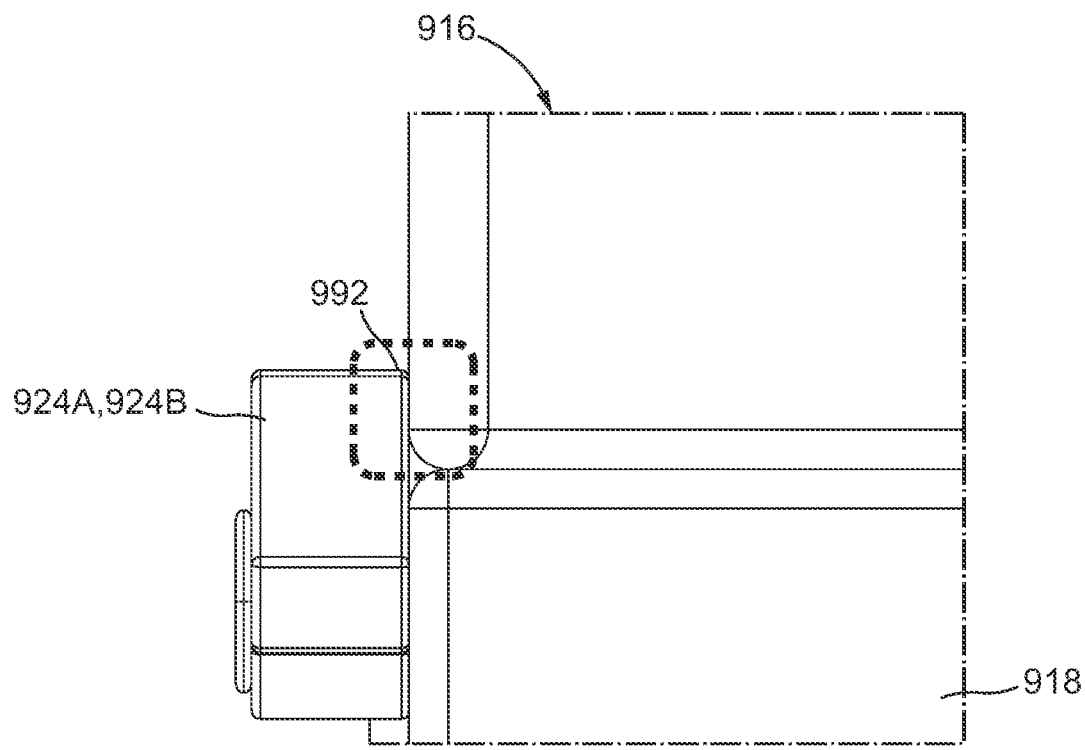
FIG. 12B is a front view of the latching mechanism usable with an apparatus for attaching an accessory in accordance with an aspect of the disclosure.
Figure 13:
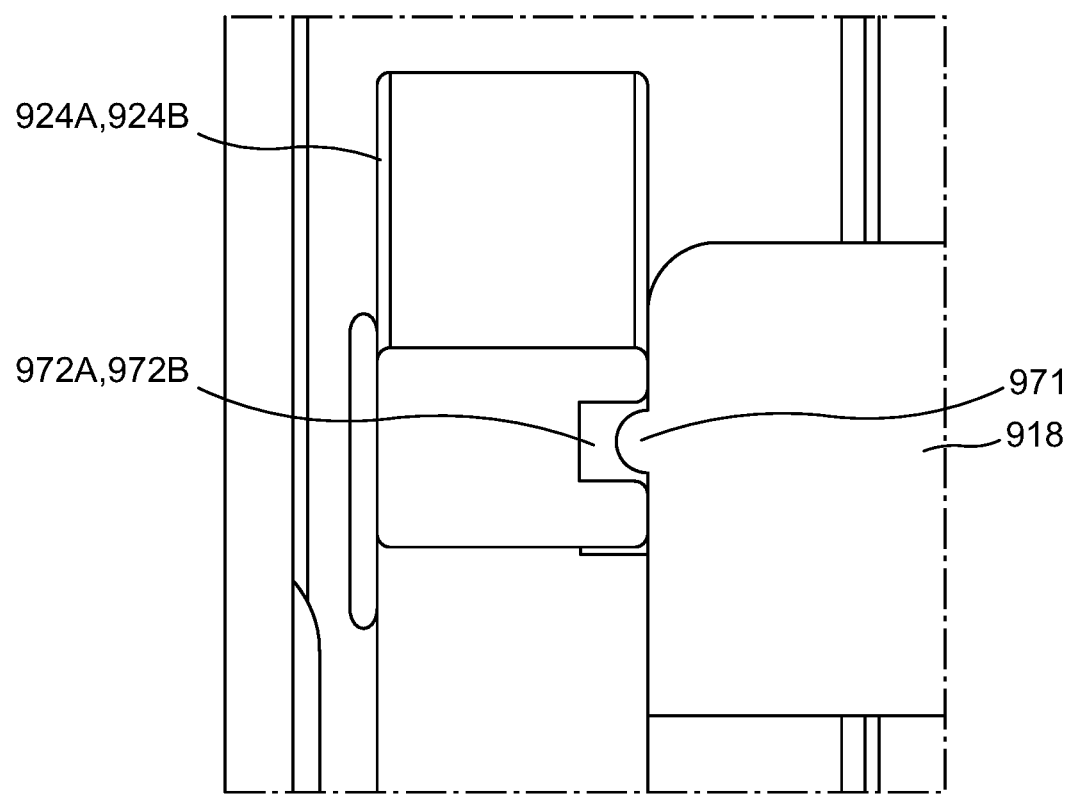
FIG. 13 is a front see-through view of an example latching mechanism usable with an apparatus for attaching an accessory, in accordance with an aspect of the disclosure.

As shown in FIGS. 11C and 13, the docking apparatus 918 may also include locking latch engagement portions 971 that may be formed as convex protrusions that are each capable of being at least partially received within a corresponding concave portion 972A, 972B of locking latches 924A, 924B. Accordingly, when each locking latch 924A, 924B is rotated to the module locking position 980B (FIG. 12A), a locking latch engagement portion 971 may be at least partially received within a corresponding concave portion 972A, 972B of locking latch 924A, 924B, respectively, and may each thereby assist in inhibiting the corresponding locking latch 924A, 924B from being inadvertently pivoted toward the module release position 980A (FIG. 12A). Further, the engagement of the concave portions 972A, 942B of each locking latch 924A, 924B with the convex portion of the corresponding latch engagement portion 971 may provide a tactile sensation to a user operating the latch 924A, 924B.

The foregoing description of various aspects and examples have been presented for purposes of illustration and description. It is not intended to be exhaustive nor to limit the disclosure to the forms described. The aspects(s) illustrated in the figures can, in some instances, be understood to be shown to scale for illustrative purposes. Numerous modifications are possible in light of the above teachings, including a combination of the abovementioned aspects. Some of those modifications have been discussed and others will be understood by those skilled in the art. The various aspects were chosen and described in order to best illustrate the principles of the present disclosure and various aspects as are suited to the particular use contemplated. The scope of the present disclosure is, of course, not limited to the examples or aspects set forth herein, but can be employed in any number of applications and equivalent devices by those of ordinary skill in the art. Rather, it is hereby intended the scope be defined by the claims appended hereto.

What is claimed is:

1. A device mountable to a vehicle seat, wherein the device comprises:
   a module having a mounting portion;
   a docking apparatus having a mounting receiving portion selectively engageable with the mounting portion, wherein the docking apparatus further comprises:
      at least a first seat anchor fastening member selectively engageable with a first child seat anchor of the vehicle seat; and
      a support member operatively connected to an adjustment portion, wherein the support member is configured to abut a seatback of the vehicle seat and the adjustment portion is configured to selectively alter a position of the docking apparatus with relation to the vehicle seat via movement of the support member away from or towards the docking apparatus.

2. The device of claim 1, wherein the adjustment portion moves the support member away from or towards the docking apparatus along a substantially horizontal direction.

3. The device of claim 1, wherein the module further comprises:
a first support member operatively connected to a first adjustment portion, wherein the first support member abuts a portion of the vehicle seat and the first adjustment portion moves the first member away from or towards the docking apparatus along a first direction, wherein the first adjustment portion comprises:
a first advancement member having a toothed portion including a plurality of teeth and operatively connected to the first support member;
a first engagement member engageable with each of the plurality of teeth of the first advancement member, wherein the first engagement member is biased towards the toothed portion of the first advancement member; and
a first button engageable with the first engagement member and the first advancement member, wherein pressing the first button causes the first engagement member to advance from a first engagement position where the engagement member is in contact with a first tooth of the first advancement member to a second engagement position where the first engagement member is in contact with a second tooth of the advancement member.

4. The device of claim 1, wherein the adjustment portion comprises:
an advancement member having a toothed portion including a plurality of teeth and operatively connected to the support member;
an engagement member engageable and separable from each of the plurality of teeth of the advancement member, wherein the engagement member is biased towards the toothed portion of the advancement member; and
a button engageable with the engagement member and the advancement member, wherein pressing the button causes a wedge portion of the engagement member to separate from a single tooth of the plurality of teeth allowing the engagement member to advance.

5. The device of claim 1, wherein the mounting receiving portion further comprises:
an opening extending along a mounting direction, wherein the opening comprises a narrow region and a widened region, wherein the mounting portion is engageable with the narrow region of the opening, the mounting portion further comprising:
a protrusion having a waist portion and a top portion that is wider than the waist portion, wherein the top portion is dimensioned so as to be capable of passing through the widened region and so as to be prevented from passing through the narrow region of the opening, and the waist portion is dimensioned so as to be capable of passing through the narrow region of the opening.

6. The device of claim 5, wherein at least one of the module and the docking apparatus further comprises a latching mechanism, wherein the latching mechanism is mounted to at least one of the module and the docking apparatus and is engageable with a surface of the other of the module and the docking apparatus.

7. A device mountable to a vehicle seat, wherein the device comprises:
a module having a mounting portion;
a docking apparatus having a first surface with a mounting receiving portion selectively engageable with the mounting portion, wherein the mounting receiving portion further comprises:
an opening extending along a mounting direction, wherein the opening comprises a narrow region and a widened region, wherein the mounting portion is engageable with the narrow region of the opening, the mounting portion further comprising:
a protrusion having a waist portion and a top portion that is wider than the waist portion, wherein the top portion is dimensioned so as to be capable of passing through the widened region and so as to be prevented from passing through the narrow region of the opening, and the waist portion is dimensioned so as to be capable of passing through the narrow region of the opening.

8. The device of claim 7, wherein the docking apparatus further comprises:
a first seat anchor fastening member selectively engageable with a first child seat anchor of the vehicle seat; and
a support member operatively connected to an adjustment portion, wherein the support member abuts a bottom portion of the vehicle seat and the adjustment portion alters the orientation of docking apparatus with relation to the vehicle seat.

9. The device of claim 8, wherein the first seat anchor fastening member is pivotally mounted to a second surface of the docking apparatus.

10. The device of claim 8, wherein the adjustment portion moves the support member away from or towards the docking apparatus in a first direction.

11. The device of claim 10, wherein the adjustment portion comprises:
an advancement member having a toothed portion including a plurality of teeth and operatively connected to the support member;
an engagement member engageable with each of the plurality of teeth of the advancement member, wherein the engagement member is biased towards the toothed portion of the advancement member; and
a button engageable with the engagement member and the advancement member, wherein pressing the button causes the engagement member to advance from a first engagement position where the engagement member is in contact with a first tooth of the advancement member to a second engagement position where the engagement member is in contact with a second tooth of the advancement member.

12. The device of claim 10, wherein the module further comprises:
a second support member operatively connected to a second adjustment portion, wherein the second support member abuts a seatback portion of the vehicle seat and the second adjustment portion moves the second support member away from or towards the docking apparatus along a second direction.

13. The device of claim 12, wherein the first direction and the second direction are substantially perpendicular.

14. The device of claim 12, wherein the second adjustment portion comprises:
a second advancement member having a toothed portion including a plurality of teeth and operatively connected to the second support member;
an second engagement member engageable and separable from each of the plurality of teeth of the second advancement member, wherein the second engagement member is biased towards the toothed portion of the second advancement member; and
a second button engageable with the second engagement member and the second advancement member, wherein pressing the second button causes a wedge portion of the second engagement member to separate from a single tooth of the plurality of teeth allowing the second engagement member to advance.

15. The device of claim 7, wherein at least one of the module and the docking apparatus further comprises a latching mechanism, wherein the latching mechanism is mounted to at least one of the module and the docking apparatus and is engageable with a surface of the other of the module and the docking apparatus.

16. A docking device mountable to a vehicle seat, the device comprising:
   a docking apparatus having a first surface with a mounting receiving portion capable of selectively engaging a mounting portion of a module, the docking apparatus further comprising:
      at least a first seat anchor fastening member selectively engageable with a first child seat anchor of the vehicle seat;
      a first support member operatively connected to a first adjustment portion, the first support member abutting a bottom portion of the vehicle seat, the first adjustment portion moving the first support member away from or towards the docking apparatus in a first direction; and
      a second support member operatively connected to a second adjustment portion, the second support member abutting a seatback portion of the vehicle seat and the second adjustment portion moving the second support member away from or towards the docking apparatus along a second direction substantially perpendicular to the first direction.

17. The docking device of claim 16, wherein the mounting receiving portion further comprises:
   an opening extending along a module mounting direction, wherein the opening comprises a narrow region and a widened region.

18. The docking device of claim 16, wherein the mounting receiving portion further comprises:
   a protrusion having a waist portion and a top portion that is wider than the waist portion, wherein the top portion is dimensioned so as to be capable of passing through an first portion of an opening in the mounting portion of the module, and is dimension so as to not be capable of passing through a second portion of the opening in the mounting portion of the module.

19. The docking device of claim 16, wherein the first adjustment portion comprises:
   an advancement member having a toothed portion including a plurality of teeth and operatively connected to the support member;
   an engagement member engageable with each of the plurality of teeth of the advancement member, wherein the engagement member is biased towards the toothed portion of the advancement member; and
   a button engageable with the engagement member and the advancement member, wherein pressing the button causes the engagement member to advance from a first engagement position where the engagement member is in contact with a first tooth of the advancement member to a second engagement position where the engagement member is in contact with a second tooth of the advancement member.

20. The docking device of claim 16, wherein the second adjustment portion comprises:
   a second advancement member having a toothed portion including a plurality of teeth and operatively connected to the second support member;
   a second engagement member engageable and separable from each of the plurality of teeth of the second advancement member, wherein the second engagement member is biased towards the toothed portion of the second advancement member; and
   a second button engageable with the second engagement member and the second advancement member, wherein pressing the second button causes a wedge portion of the second engagement member to separate from a single tooth of the plurality of teeth allowing the second engagement member to advance.

* * * * *